(12) United States Patent
Agarwal et al.

(10) Patent No.: US 10,534,788 B2
(45) Date of Patent: Jan. 14, 2020

(54) AUTOMATICALLY DETERMINING A RECOMMENDED SET OF ACTIONS FROM OPERATIONAL DATA

(71) Applicant: International Business Machines Corporation, Armonk, NY (US)

(72) Inventors: Shivali Agarwal, Bangalore (IN);
Vishalaksh Aggarwal, Bangalore (IN);
Gaargi B. Dasgupta, Bangalore (IN);
Vijay Ekambaram, Bangalore (IN);
Giriprasad Sridhara, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 14/942,187

(22) Filed: Nov. 16, 2015

(65) Prior Publication Data
US 2017/0140010 A1    May 18, 2017

(51) Int. Cl.
*G06F 16/00* (2019.01)
*G06F 16/248* (2019.01)
*G06F 3/0484* (2013.01)
*G06F 16/2455* (2019.01)

(52) U.S. Cl.
CPC .......... *G06F 16/248* (2019.01); *G06F 3/0484* (2013.01); *G06F 16/2455* (2019.01)

(58) Field of Classification Search
CPC ............... G06F 16/248; G06F 16/2455; G06F 16/30484
See application file for complete search history.

(56) References Cited

U.S. PATENT DOCUMENTS

| 2006/0143034 A1* | 6/2006 | Rothermel ............. G06Q 10/10 705/301 |
| 2013/0159039 A1 | 6/2013 | Brech et al. |
| 2014/0006861 A1 | 1/2014 | Jain et al. |

(Continued)

OTHER PUBLICATIONS

Jiang et al., CRCTOL: A semantic-based domain ontology learning system, Journal of the American Society for Information Science and Technology 61(1):150-168 • Jan. 2010.

(Continued)

*Primary Examiner* — Usmaan Saeed
*Assistant Examiner* — Paul Kim
(74) *Attorney, Agent, or Firm* — Ryan, Mason & Lewis, LLP

(57) ABSTRACT

Methods, systems, and computer program products for determining a recommended set of actions from operational data are provided herein. A computer-implemented method includes associating multiple action templates with a set of operational data corresponding to a query; selecting a first action template from the multiple action templates; identifying one or more attributes associated with the first action template; forming a first step of a resolution action in response to the query by populating the first action template with at least one of the attributes; repeating, based on the first step of the resolution action and the set of operational data, said selecting, said identifying, and said forming for at least a second action template to form a second step of the resolution action; and outputting the resolution action, wherein the resolution action comprises a fixed sequence of at least the first step and the second step.

13 Claims, 10 Drawing Sheets

(56) References Cited

U.S. PATENT DOCUMENTS

2014/0244816 A1    8/2014  Anerousis et al.
2016/0034159 A1*   2/2016  Vranjes ............... G06F 3/04847
                                                            715/803

OTHER PUBLICATIONS

Potharaju et al., Juggling the Jigsaw: Towards Automated Problem Inference from Network Trouble Tickets, 10th USENIX Symposium on Networked Systems Design and Implementation (NSDI '13).
Ausum Systems, https://www.ausum.net/about/what.cfm, 2012.
Wikipedia, Never-Ending Language Learning (NELL), https://en.wikipedia.org/w/index.php?title=Never-Ending_Language_Learning&oldid=664595378, May 29, 2015.
R. Potharaju, N. Jain, and C. Nita-Rotaru, "Juggling the jigsaw: Towards automated problem inference from network trouble tickets," in Presented as part of the 10th USENIX Symposium on Networked Systems Design and Implementation (NSDI 13), 2013, pp. 127-141.
D. Majumdar, R. Catherine, S. Ikbal, and K. Visweswariah, "Privacy protected knowledge management in services with emphasis on quality data," in Proceedings of the 20th ACM International Conference on Information and Knowledge Management, ser. CIKM '11, 2011, pp. 1889-1894.
G. A. Miller, "Wordnet: A lexical database for English," Communications of the ACM vol. 38, No. 11: 39-41., vol. 38, No. 11, 1995.
Word2vec, https://code.google.com/p/word2vec/.
M.-C. de Marneffe and C. D. Manning, "The stanford typed dependencies representation," in Coling 2008: Proceedings of the Workshop on Cross-Framework and Cross-Domain Parser Evaluation, ser. CrossParser '08, 2008, pp. 1-8.
R. Agrawal and R. Srikant, "Fast algorithms for mining association rules in large databases," in Proceedings of the 20th International Conference on Very Large Data Bases, ser. VLDB '94, 1994, pp. 487-499.
Dasgupta et al., "Towards auto-remediation in services delivery: Context-based classification of noisy and unstructured tickets," in Service-Oriented Computing—12th International Conference, ICSOC 2014, Paris, France, Nov. 3-6, 2014. Proceedings, 2014, pp. 478-485.

* cited by examiner

AUTOMATICALLY DETERMINING A RECOMMENDED SET OF ACTIONS FROM OPERATIONAL DATA

FIELD

The present application generally relates to information technology (IT), and, more particularly, to operational data management techniques.

BACKGROUND

Human intensive business processes such as IT change management can include complex changes including multiple tasks that need to be executed in a particular sequence. Such changes are commonly triggered due to repeated incidents and can often include a complex set of actions that includes multiple steps and requires multiple coordination efforts between practitioners.

Service practitioners log summaries of change actions in change tickets. Day-to-day IT operations can also result in incident tickets. Practitioners can also log summaries of resolution actions in incident tickets. However, practitioners often write incomplete, incorrect and/or abbreviated sentences as part of the tickets. Such lack of completeness and inconsistent structure in ticket descriptions renders even the basic task of automated classification challenging. To be able to carry out workflow determination for a resolution can be even more challenging, as, by way of example, manual ticket and change analysis can be a time-consuming exercise.

SUMMARY

In one embodiment of the present invention, techniques for automatically determining a recommended set of actions from operational data are provided. An exemplary computer-implemented method can include steps of associating multiple action templates with a set of operational data corresponding to a query; selecting a first action template from the multiple action templates; identifying one or more attributes associated with the first action template; forming a first step of a resolution action in response to the query by populating the first action template with at least one of the one or more attributes; repeating the steps of (i) selecting, (ii) identifying, and (iii) forming for at least a second action template from the multiple action templates to form a second step of the resolution action, wherein repeating is based on (a) the first step of the resolution action and (b) the set of operational data; and outputting the resolution action, wherein the resolution action comprises a fixed sequence of at least (i) the first step and (ii) the second step.

In another embodiment of the invention, an exemplary computer-implemented method can include outputting the resolution action, wherein the resolution action comprises a tree of action steps comprising at least (i) the first step and (ii) the second step.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
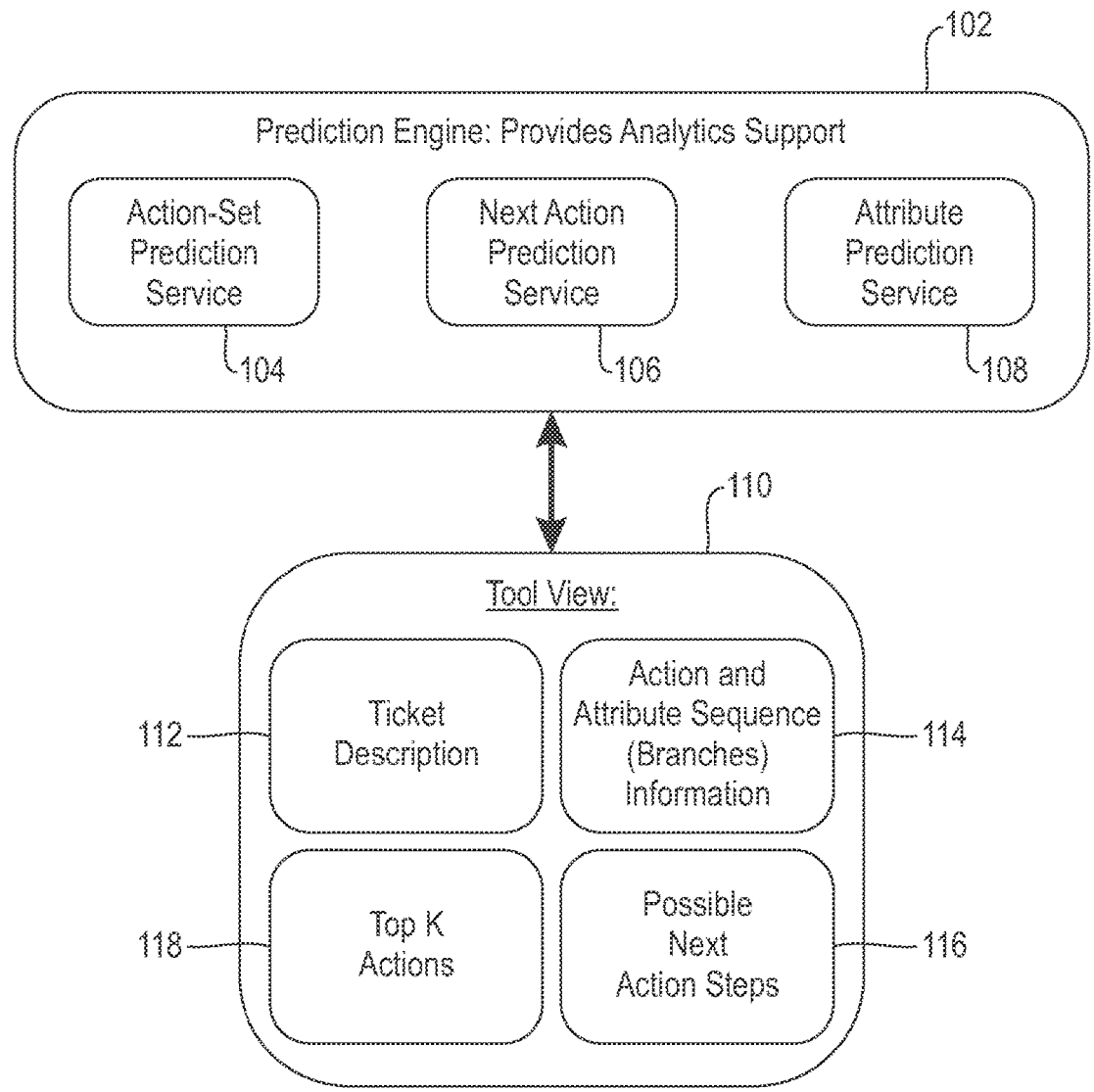
FIG. 1 is a diagram illustrating system architecture, according to an exemplary embodiment of the invention.

As described herein, an embodiment of the present invention includes automatically determining a recommended set of actions from operational data. As detailed herein, in IT server management, change requests are often raised to handle management tasks. Such requests can be subsequently completed by following a series of steps described in a manually created resolution and/or detailed description field. It is often required that all actions (steps) be performed in the prescribed order, as missing a step or executing an incorrect step can lead to problems in the data center environment. Accordingly, at least one embodiment of the invention includes implementing an automated system that takes a change request as input, and produces a set of steps to be performed to fulfill the change request as output. As such, given a change and/or incident ticket request, one or more embodiments of the invention includes facilitating identification of a set of actions to execute and a corresponding action sequence to resolve the issue mentioned in the ticket.

As detailed further herein, at least one embodiment of the invention includes automatically determining a set of action-steps to be taken in an exact sequence for resolving an issue mentioned in a ticket (for example, operational data). One or more embodiments of the invention include providing and/or implementing a semi-automated tool for automatically suggesting to a user (for example, an analyzer) a specific sequence of action-steps to perform accurate ticket analysis. Such a tool can carry out such action by analyzing and correlating the current state in each of various quadrants, and also engaging the user (analyzer) through one or more visualizations and/or interactions for predicting a set of action-steps (action, attributes) and an exact sequence thereof for resolving a ticket. At least one embodiment of the invention includes predicting and/or outputting a list of possible actions such as, for example, the top-k possible actions, the top-k possible attributes.

As detailed herein, one or more embodiments of the invention include determining a set of action-steps with a corresponding proper execution sequence based on steps taken using IT operational data. Such steps can include capturing an action as a <A1, arg1> tuple, and predicting the top-k action tuples given a ticket description. Such steps can also include predicting the next top-k actions given a ticket description and a current action-step, as well as predicting the top-k possible attributes given a ticket description and a current action-step template. At least one embodiment of the invention further includes correlating the above-noted steps using a semi-automated tool to interactively suggest to a user (analyzer) a determination of the set of action-steps with the proper sequence to resolve the ticket.

As described herein, FIG. 1 through FIG. 8 share certain components, as encompassed via the numerical labels used in connection with the noted figures, in depicting one or more embodiments of the invention.

As such, FIG. 1 is a diagram illustrating system architecture, according to an embodiment of the invention. By way of illustration, FIG. 1 depicts a prediction engine 102 as well as a tool view 110 (as further described herein). The prediction engine 102, as illustrated in FIG. 1, provides multiple services. For instance, the prediction engine can provide an action-set prediction service 104, a next action prediction service 106, and an attribute prediction service 108.

With respect to the action-set prediction service 104, input can include a ticket description (such as element 112 depicted in FIG. 1) and output can include an identification of the top-K possible actions (such as element 118 depicted in FIG. 1) determined from action history and/or a database. Such actions might include, for example, "login to server," "restart server," "reboot server," "add random access memory (RAM)," "edit settings," etc.

With respect to the next action prediction service 106, input can include the ticket description 112 and a selected action, and output can include an identification of the top-K possible next actions (such as element 116 depicted in FIG. 1) that co-occurred with the selected action. By way merely of example, after a selected action of "login to server," a next action could include "add RAM."

With respect to the attribute prediction service 108, input can include the ticket description 112 and an action, and output can include an identification of the top-K possible attributes determined from the ticket. Such an attribute might include, for example, that RAM equals 24 gigabytes (GB).

Referring again to FIG. 1, the tool view 110 is connected to and/or correlated with the prediction engine 102 and provides interaction capabilities for ticket analysis. As briefly noted above and further detailed herein, the tool view can include the ticket description 112, an identification of the top-K actions 118, an identification of one or more possible next action steps 116, and an identification of an action and attribute sequence (branches) formation 114. As used herein, "branches" refer to the possibility of creating a tree of action steps. A sequence enables exploring only one path; however, with a tree structure being supported, a user can explore multiple branches and do away with and/or ignore branches that do not look promising.

As detailed herein, functions performed by the system depicted in FIG. 1 can include action-set prediction, attribute prediction, and next action prediction. Each such function can be provided, for example, as a service to the tool view 110. The historical learning can be carried out offline and the models loaded into the system. The manners in which services (such as those detailed above) can leverage the learned model and corresponding knowledge are further described herein.

At least one embodiment of the invention includes action extraction. Commonly, actions are written as a series of steps. Additionally, some of the well-formed action sequences can have numbered steps. There can be text which is noisy and/or not well formed. Accordingly, at least one embodiment of the invention can include identifying individual steps in a sequence. This can be carried out by looking for patterns such as, for example, a numeric and/or alpha-numeric series, and/or line breaks in cases wherein text is not numbered or bulleted.

In connection with one or more embodiments of the invention, learning is performed from historical data, which can include, for example, IT tickets (also referred to herein as "IT operational data"). Such learning is carried out in order to subsume multiple kinds of tickets and other data generated as part of IT operations. Further, models built, such as described herein, can be leveraged by the services in the tool.

Once the individual steps are identified, succinct action phrases can be extracted via the following steps:

a) Identification of phrases from resolution text that are likely to represent actions.

b) Deduction of a domain dictionary in terms of operations and entities from the extracted action phrases. Verbs are marked as operations and nouns are marked as entities; for example, a server reboot has "server" as an entity and "reboot" as an operation.

c) Creation of succinct action phrases by associating operations with suitable entities based on proximity in resolution text.

Additionally, at least one embodiment of the invention includes implementing canonical representation. A canonical representation of similar entities and operations is utilized for the comparison of different resolution sequences for similarity. By way of illustration, different IT analysts often use different words to convey the same meaning, (for example, server, host, and machine are commonly used in the same context). As the vocabulary is commonly IT domain specific, a standard English language based dictionary may not be sufficient to capture semantic similarity. The canonical representation of entities and operations is determined by deducing semantic similarity using a co-occurrence method. The base set of entities and operations can be taken from the domain dictionary arrived at during the action extraction step, and the canonical term representation of a similar set is chosen based on term frequency. For using this information in prediction services, the data are stored as a key value map such that each entity and/or operation maps to its canonical representation.

Attributes for entities are also learned using resolution text and the description text by parsing the text to obtain and/or generate a typed dependency tree. The noun-noun relations that signify a prenominal or compound modifier are used to determine attributes. For example, in the sentence "Ensure server is in maintenance mode," the parser returns "maintenance" as the compound modifier (also known as the attribute for mode). The attributes data can be stored separately, and each entity is a key and maps to a list of attributes with attributes ordered on frequency.

Additionally, in one or more embodiments of the invention, sequence analysis is used on extracted resolution sequences to determine the most predominant action sequences. The action steps in a resolution sequence are converted to a canonical representation for this purpose and referred to as action templates. The intuition here is that actions are commonly related and one action often implies some related actions. At least one embodiment of the invention includes using frequent itemset analysis wherein every ticket is a transaction and every action within a transaction is an item. The number of items within a transaction is commonly lower than the total number of transactions.

By way of example, assume that there are three transactions containing the canonical representation of actions as follows:

{Login, Housekeep, Search VM, Monitor Job, Upgrade RAM}
{Search VM, Upgrade RAM, Select VM, Login, Housekeep}
{Select VM, Search VM, Free Disk, Upgrade RAM, Housekeep}

An itemset is frequent if it appears above a support threshold of k. A frequent itemset thus represents a common sequence of actions. Also, in one or more embodiments of the invention, the longer the itemset, the higher the confidence of that being the correct recommended action sequence.

As described below, FIG. 2 through FIG. 8 illustrate actions carried out via the tool view 110, and specifically with respect to an origin 120, as well as to Quadrant 1 (111), Quadrant 2 (113), Quadrant 3 (115) and Quadrant 4 (117) of the tool view 110. Quadrants, as used herein, are means of splitting the tool view 110 into meaningful boxes such that there is a clear separation of concerns and the user is provided an intuitive mechanism of engagement. The origin 120, as detailed herein, represents a reference point that can be used to depict relevance in the tool view 110. For example, predicted actions in Quadrant 3 and Quadrant 4 are placed closer to the origin 120 if those predicted actions are more relevant than other predicted actions. Additionally, one or more embodiments of the invention include correlating the size of an action representation with relevance (for example, a larger action representation indicates increased relevance for that action).

Figure 2:
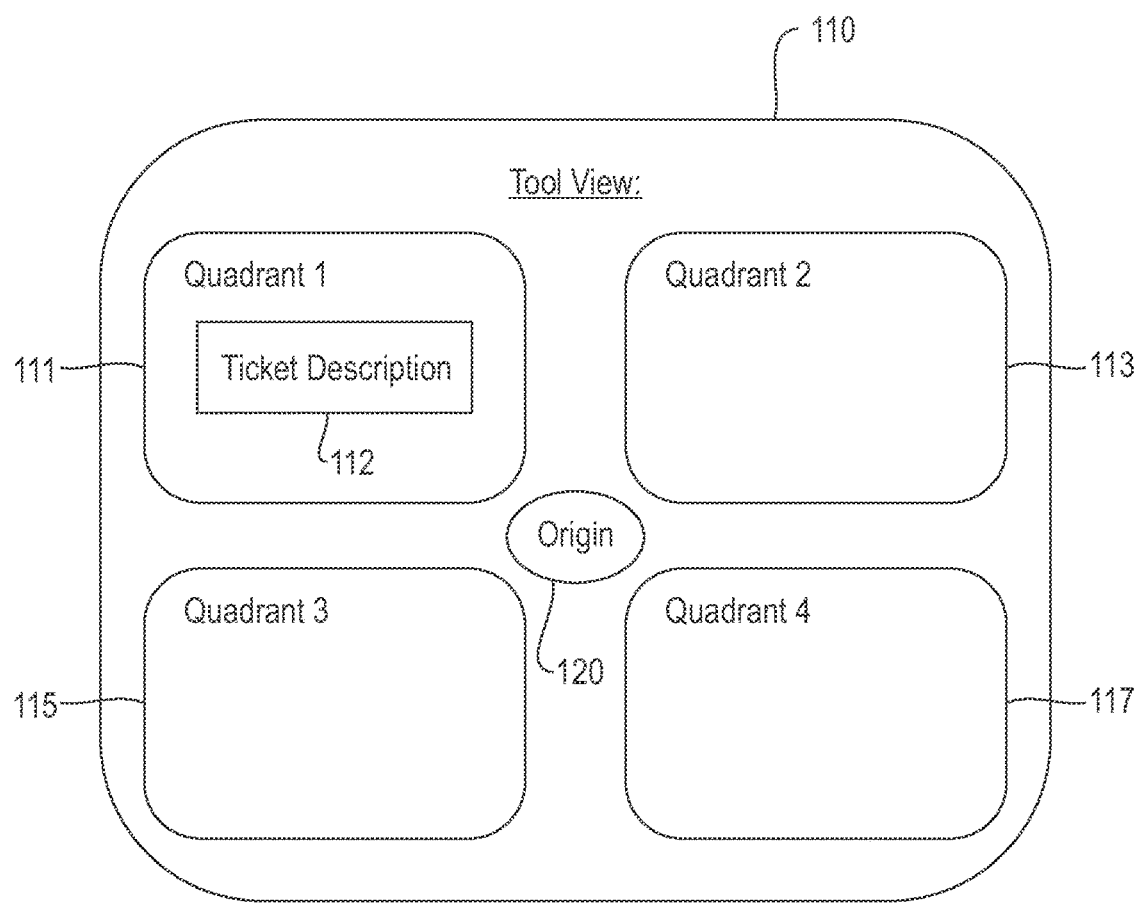
FIG. 2 is a diagram illustrating an aspect of an exemplary embodiment of the invention.

FIG. 2 is a diagram illustrating an aspect of an exemplary embodiment of the invention. By way of illustration, FIG. 2 depicts placing (for example, dragging and dropping) the ticket description 112 into Quadrant 1 (111) of the tool view 110. From unstructured text of an existing repository of previously completed change requests and/or tickets, at least one embodiment of the invention can include automatically extracting the steps associated with the ticket description 112, as well as the <action, argument> tuples from each such step.

One or more embodiments of the invention additionally include extracting information from resolution text using heuristics such as, for example, the presence of delimiters "1: 2:," etc. For each resolved change request, at least one embodiment of the invention includes obtaining <action, argument> tuples corresponding to the steps performed to resolve the request. <action, argument> tuple extraction can be carried out, for example, via natural language analysis of each step. Additionally, <action, argument> tuple extraction can include extracting action phrases by capturing the complete action set from resolutions/change descriptions (without using domain experts). Extracted actions can also be ranked in terms of statistical and discriminating significance (which can be determined via one or more frequency measures such as term frequency-inverse document frequency (tf-idf), etc.).

At least one embodiment of the invention can also include identifying actions by performing part-of-speech (POS) tagging of resolution text, which contains embedded actions. Also, identified POS patterns can be mapped to certain actions. Such patterns can include, for example, verbs along with some adjoining nouns and/or adjectives. In identifying actions, input can include resolution text for a given set of tickets, which can be used as a corpus for extracting one or more embedded actions. POS tagging of resolution text can be carried out without removing stop words. Also, at least one embodiment of the invention includes applying pattern matching on POS-tagged data after the removal of stop words, and tagging the text that matches a pattern.

In one or more embodiments of the invention, POS patterns can be identified via frequency analysis on POS-tagged text and/or scanning of sentence parts that appear similar to actions. Also, POS tagging can include tagging a verb as an adjective based on context, such as, for instance, in the example of "clear cache."

As also detailed herein, an action ontology includes concepts of operation and object/operand; also referred to herein as an entity. Operations might include, for example, extending, restarting, moving, deleting, etc. Entities might include, for example, a file, a system, a server, a tape, a library, etc. In one or more embodiments of the invention, actions can be summarized in terms of entities and operations, for example, by mapping nouns to entities and verbs to operations, wherein such nouns and verbs are extracted from phrases obtained using POS patterns.

Figure 3:
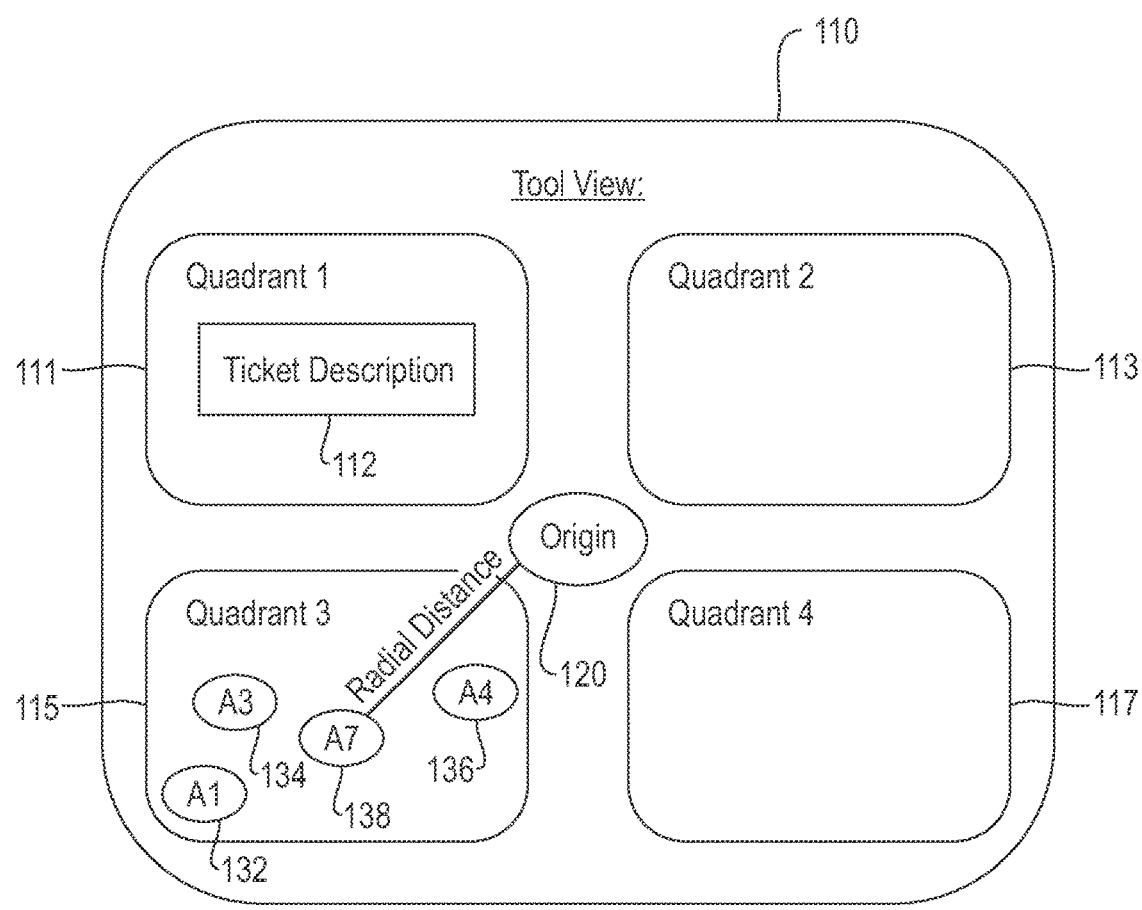
FIG. 3 is a diagram illustrating an aspect of an exemplary embodiment of the invention.

FIG. 3 is a diagram illustrating an aspect of an exemplary embodiment of the invention. By way of illustration, FIG. 3 depicts the tool view 110 calling action-set prediction service (104, as depicted in FIG. 1) in the background and retrieving the top-K actions, which include action 132 (A1), action 134 (A3), action 136 (A4) and action 138 (A7). These top-K actions are populated in Quadrant 3 (115), as depicted in FIG. 3. Note that populating these actions in Quadrant 3 is a design decision related to placement of how to use the four quadrants, and is specific merely to the depicted example embodiment of the invention. In this example embodiment, because the ticket description is in Quadrant 1, it can be considered logical to populate the predicted actions in the Quadrant below Quadrant 1. However, it should be appreciated that one or more other design decisions can be carried out and/or embodied in one or more additional embodiments of the invention.

FIG. 3 also illustrates, as an example, the radial distance between action 138 (A7) and the origin 120. In at least one embodiment of the invention, a smaller radial distance from the origin 120 increases the possibility of the corresponding action to be in the final action-set.

At the end of this step of the action-set prediction service, an example embodiment of the invention will have compiled a collection of change requests with the set of steps (<action, argument>) performed to resolve the request. An order among tuples can be identified using a sequence determining algorithm. At least one embodiment of the invention can also include pattern searching in a ticket description set, for which input includes the set of ticket descriptions and the output includes a set of common patterns. For each ticket description (such as ticket description 112), such an embodiment includes carrying out a pre-processing step which replaces words and/or phrases having a given semantic meaning to a common word and/or phrase. Also, common patterns are learned from the processed ticket description in an unsupervised manner, and for each ticket description, a set of common patterns (P1, P2, P3 . . . ) is generated as output.

Figure 4:
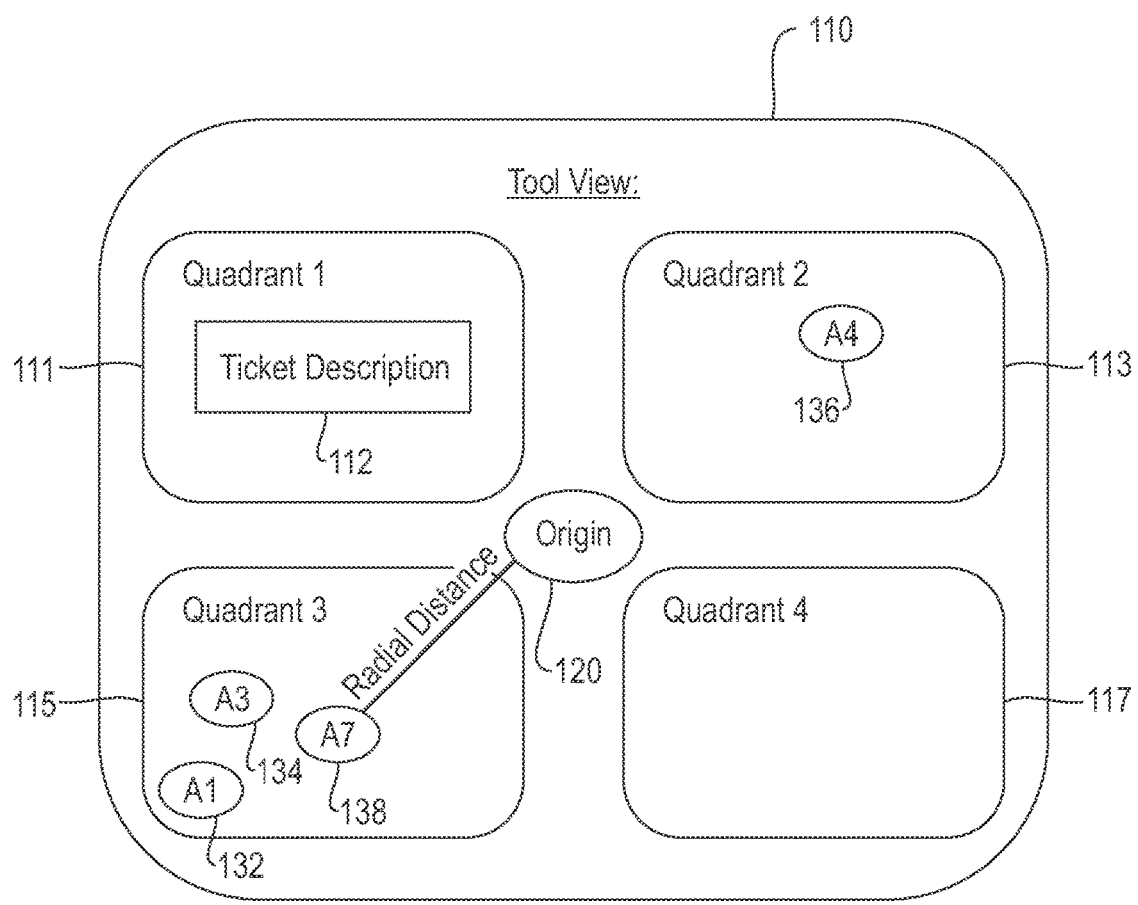
FIG. 4 is a diagram illustrating an aspect of an exemplary embodiment of the invention.

FIG. 4 is a diagram illustrating an aspect of an exemplary embodiment of the invention. By way of illustration, FIG. 4 depicts moving the first action-step, action 136 (A4, carried out, for example, by a user dragging the first action-step) from Quadrant 3 (115) to Quadrant 2 (113). In the example embodiment depicted in FIG. 4, Quadrant 3 is populated with predicted action templates, and the user selects the most appropriate predicted action and drags the action to Quadrant 2. A4 (136) is placed closest to the origin 120 in terms of radial distance, indicating that this is the most likely first action. However, it should again be appreciated that one or more other design decisions with respect to the quadrants can be carried out and/or embodied in one or more additional embodiments of the invention.

Figure 5:
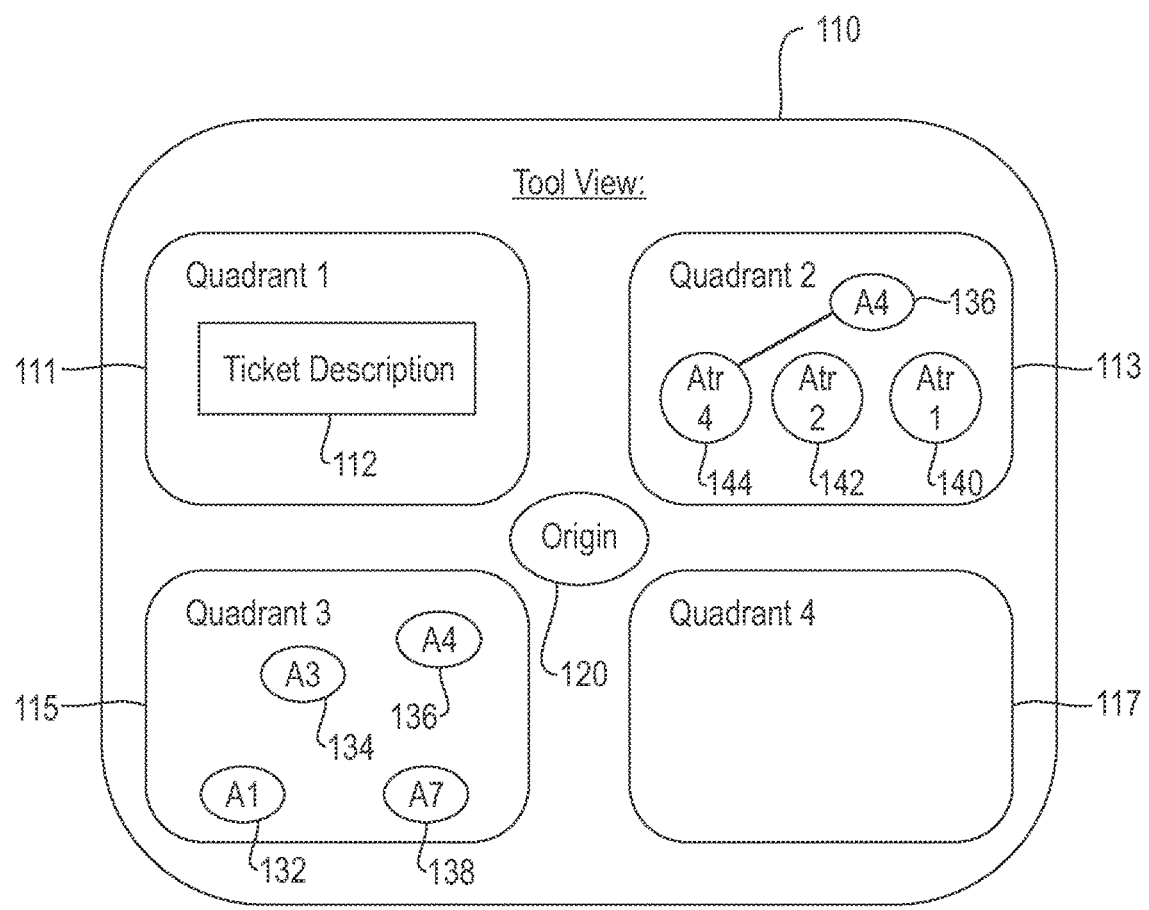
FIG. 5 is a diagram illustrating an aspect of an exemplary embodiment of the invention.

FIG. 5 is a diagram illustrating an aspect of an exemplary embodiment of the invention. Based on the action in Quadrant 2 (113) detailed in connection with FIG. 4, FIG. 5 illustrates using the attribute prediction service (element 108 in FIG. 1) to predict the top-K possible attributes (atr) for the above-noted particular action (action 136 (A4)) in Quadrant 2 (113). The attributes depicted in FIG. 5 include attribute 140 (Atr 1), attribute 142 (Atr 2), and attribute 144 (Atr 4). In one or more embodiments of the invention, a smaller radial distance between an attribute and an action increases the correlation between the action and the attribute.

As detailed herein, at least one embodiment of the invention includes performing an action-set prediction service (via, for example, element 104 as depicted in FIG. 1) to determine the top-K possible actions for a ticket description (such as ticket description 112), wherein the value of K can be pre-determined and/or user-selected. The input of such a service includes a ticket description, and the output includes the top-K possible actions. Such a service can include converting ticket description to a set of patterns to identify similar tickets {S} having the same patterns, and determining all possible action tuples in {S}. Subsequently, the top-K possible tuples in {S} can be identified.

Additionally, such as illustrated in FIG. 5, at least one embodiment of the invention includes performing an attribute prediction service (via, for example, element 108 as depicted in FIG. 1), wherein the input for such a service includes a ticket description (such as ticket description 112) and a current action-step, and wherein the output includes one or more attributes. Such a service can include identifying one or more entities in the action-step, and extracting attributes of the matched entities using a relation extractor. As used herein, a relation extractor is a parser for natural language text that returns dependency parse trees and indicates the parts of speech relations between two words in a sentence. By way of example, one or more embodiments of the invention can include using a noun-noun (NN) modifier relationship. By way of example, for "add 24 GB RAM," the NN relationship will detect that "24 GB" is the modifier of the noun RAM. This "24 GB" then becomes the attribute that will be predicted. If the entity in the action is not mentioned in the description, at least one embodiment of the invention can include learning the attributes from historical tickets using a relation extractor and frequency analysis to suggest the top-K attributes.

As detailed herein, one or more embodiments of the invention can additionally include performing a next action prediction service (via, for example, element 106 as depicted in FIG. 1), wherein the input for such a service includes a ticket description (such as ticket description 112) and a last (or most recent) action, and wherein the output includes the top-K possible next actions. Such a service can include determining the next (or subsequent) sequence of actions that co-occur with the selected action, and obtaining the top-K next actions from the determined sequences. If there are multiple branches (of actions) in Quadrant 2 (113), then the next action can be selected based on the selected branch.

Figure 6:
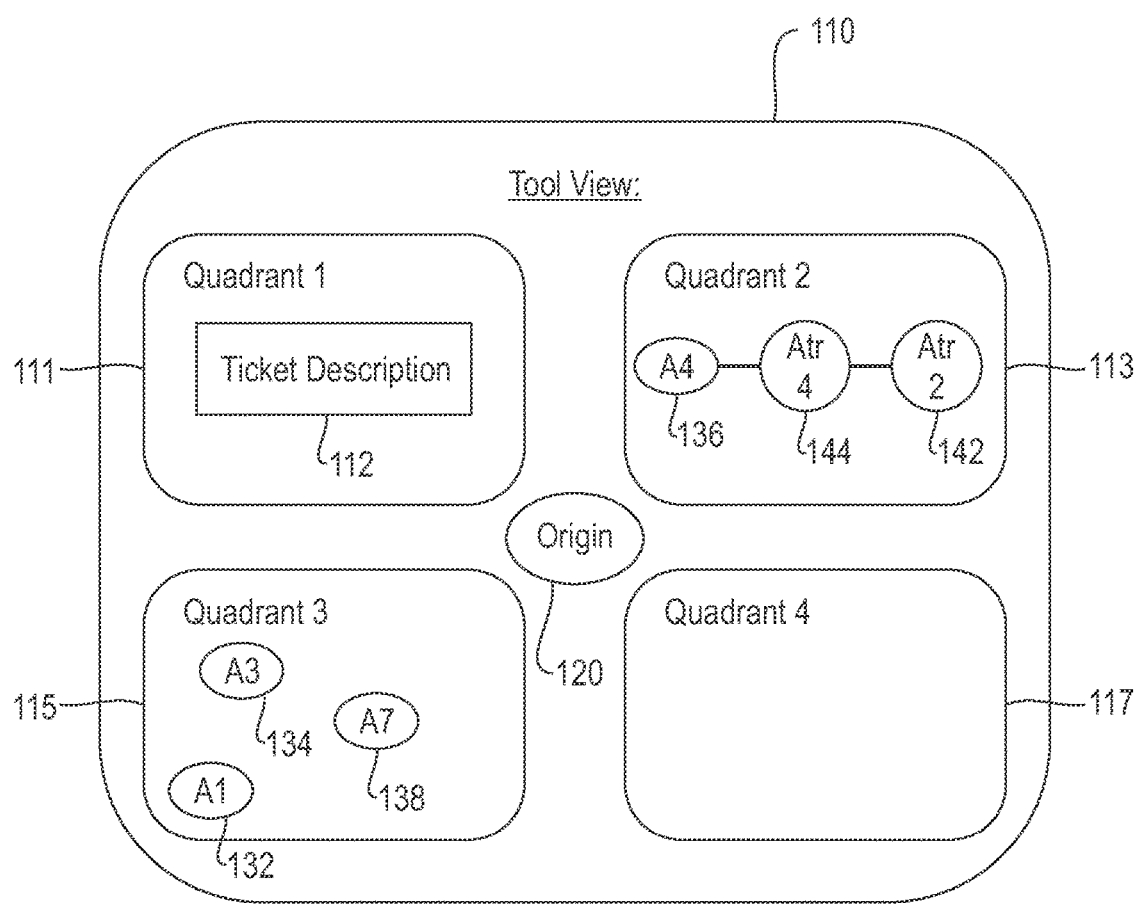
FIG. 6 is a diagram illustrating an aspect of an exemplary embodiment of the invention.

FIG. 6 is a diagram illustrating an aspect of an exemplary embodiment of the invention. By way of illustration, FIG. 6 depicts moving the suitable attributes (carried out, for example, via a user dragging the suitable attributes) to fill an action template. In the example depicted in FIG. 6, the suitable attributes include attribute 144 (Atr 4) and attribute 142 (Atr 2). In such an embodiment, an action is in the form of one or more templates which are filled with one or more attributes.

Figure 7:
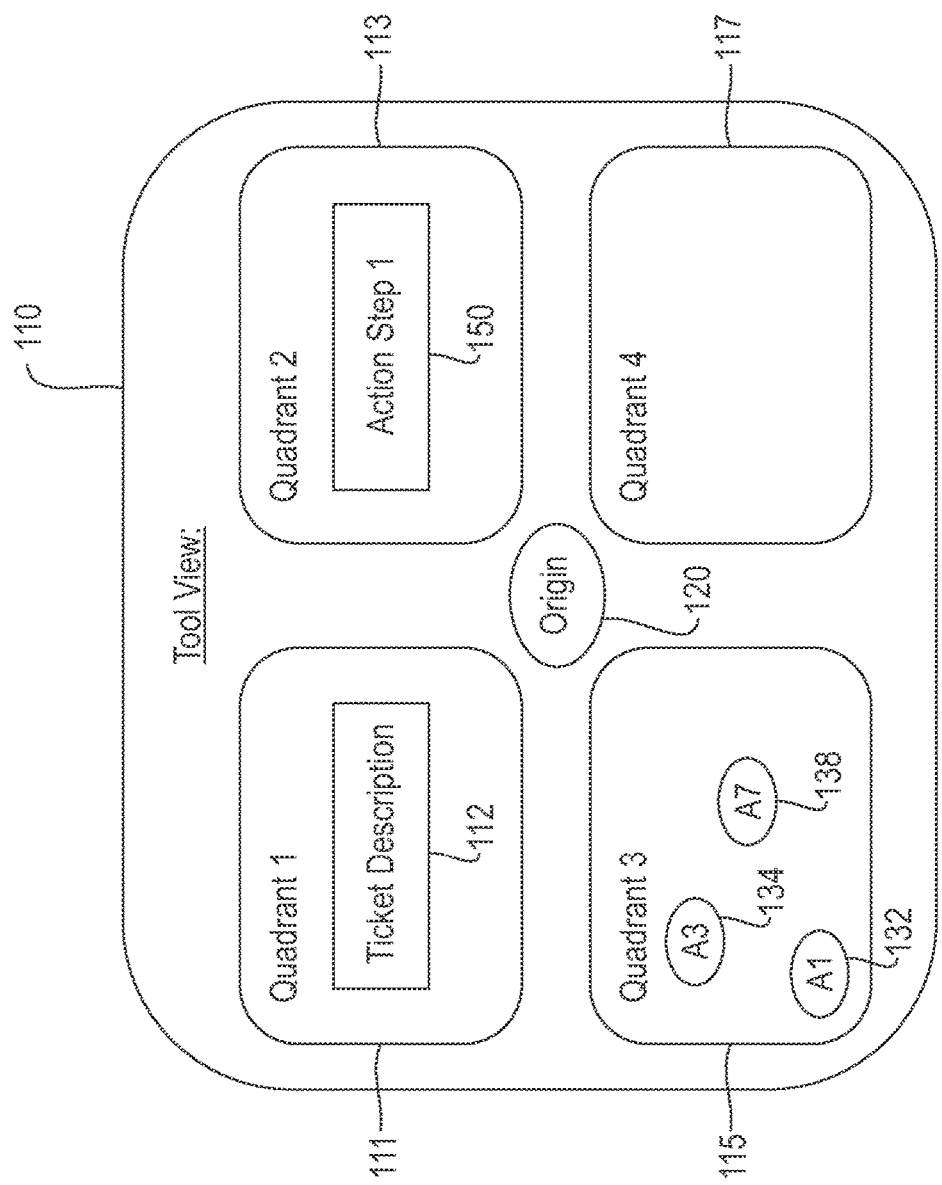
FIG. 7 is a diagram illustrating an aspect of an exemplary embodiment of the invention.
Figure 7:
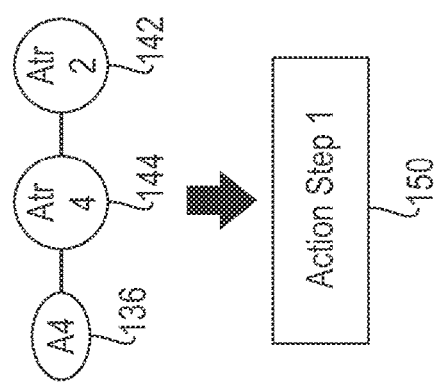

FIG. 7 is a diagram illustrating an aspect of an exemplary embodiment of the invention. By way of illustration, FIG. 7 depicts formulating a given action-step 150 (Action-Step 1) utilizing action 136 (A4), attribute 144 (Atr 4) and attribute 142 (Atr 2).

Figure 8:
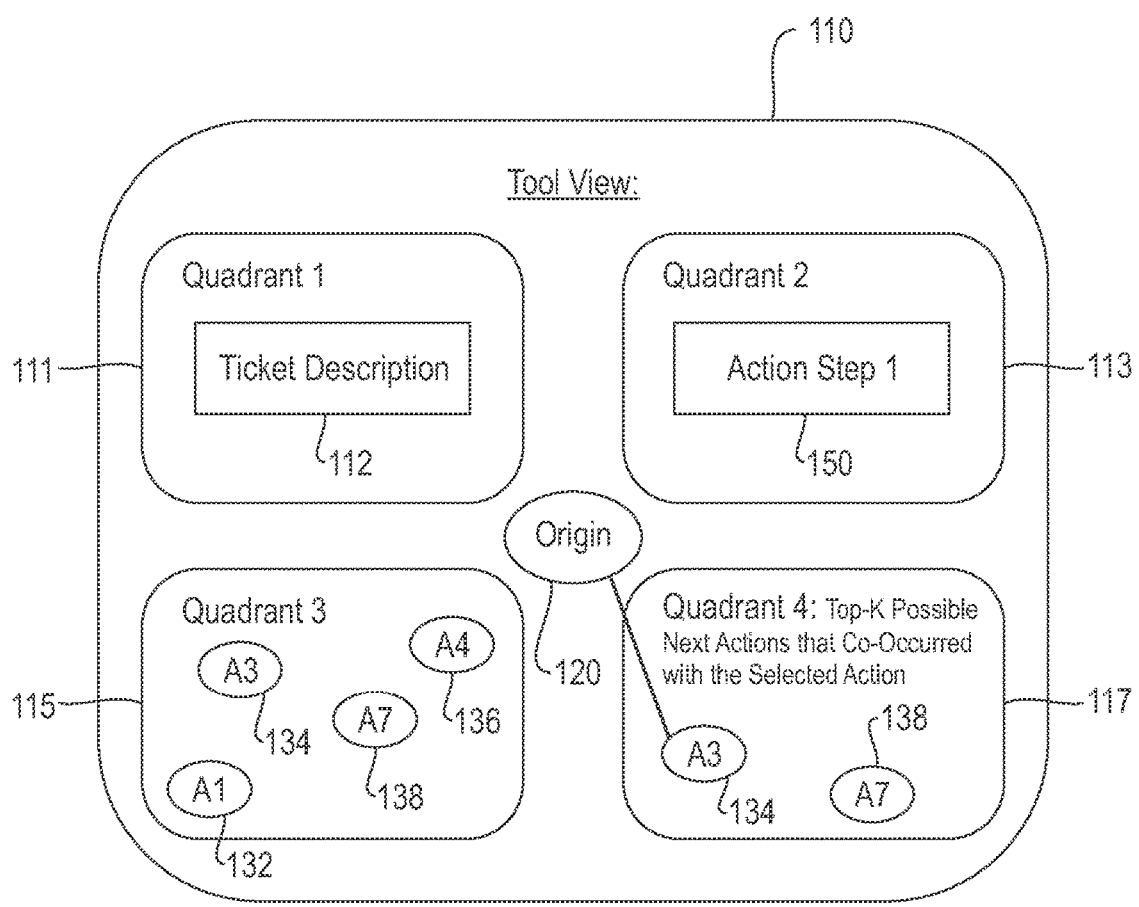
FIG. 8 is a diagram illustrating an aspect of an exemplary embodiment of the invention.

FIG. 8 is a diagram illustrating an aspect of an exemplary embodiment of the invention. In one or more embodiments of the invention, given the current action-step 150 and the ticket description 112, the tool view 110 can call the next action prediction service (such as element 106 depicted in FIG. 1) in the background and retrieve the top-K next possible actions. The top-K next possible actions can be populated in Quadrant 4 (117). In the example depicted in FIG. 8, the top-K next possible actions include action 134 (A3) and action 138 (A7). Additionally, in at least one embodiment of the invention, a smaller radial distance between a given action and the origin 120 increases the possibility of the given action being in the final action-set.

Further, in one or more embodiments of the invention, a user can subsequently carry out one or more iterations of the above-detailed steps (such as illustrated in FIG. 4 through FIG. 8, for example) to fill all of the next complete action-steps for a ticket based on suggestions from Quadrant 4 (117). Quadrant 4 contains the action template suggestions based on the most recent action in the sequence that the user is constructing in Quadrant 2. Quadrant 4 is more dynamic in nature in this respect because it will suggest the next action based on the most recent action in the sequence. Also, one or more embodiments of the invention can include supporting a scenario wherein a user selects an action in the sequence and Quadrant 4 outputs the next actions steps. The actions in Quadrant 3 can, for example, be static and a function of the description provided in Quadrant 1.

Figure 9:
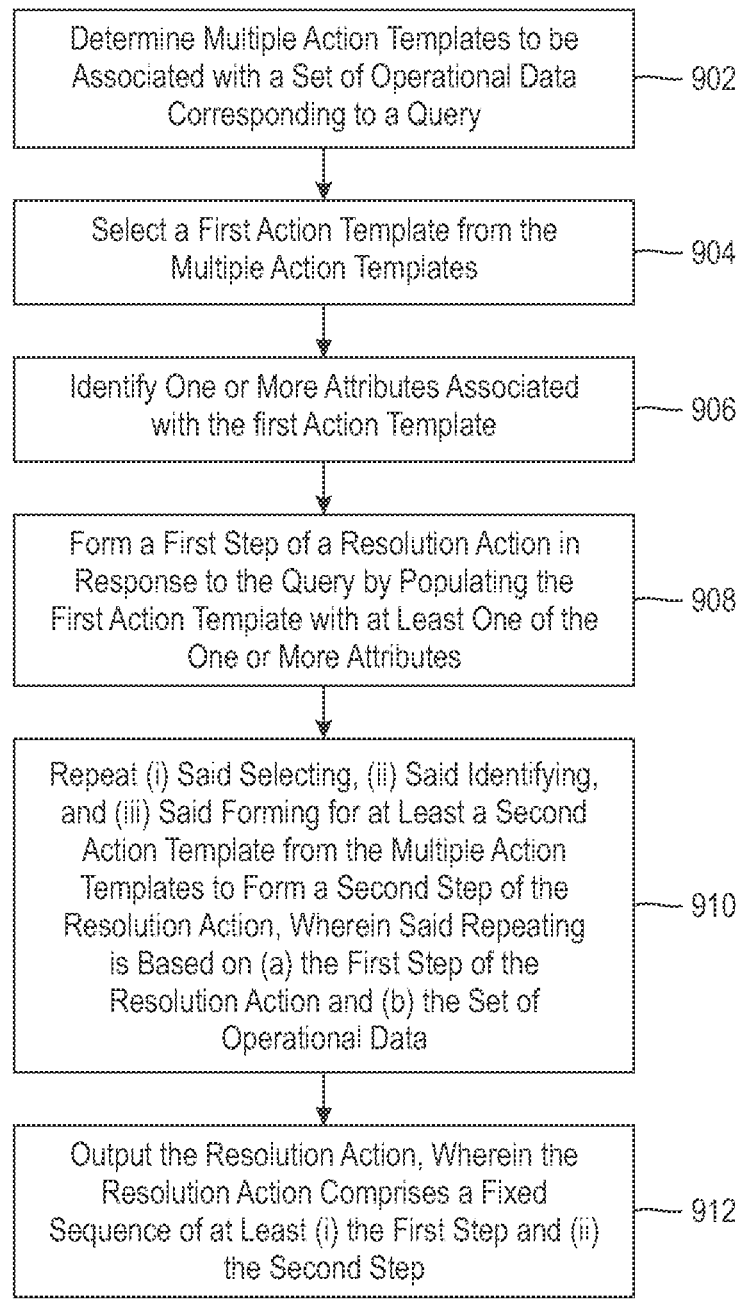
FIG. 9 is a flow diagram illustrating techniques according to an embodiment of the invention.

FIG. 9 is a flow diagram illustrating techniques according to an embodiment of the present invention. Step 902 includes determining multiple action templates to be associated with a set of operational data corresponding to a query. In associating the multiple action templates with the set of operation data, the operational data can include change tickets, incident tickets, work logs, etc. The multiple action templates can include the top-K action templates derived from a collection of action templates. Also, in one or more embodiments of the invention, the query is given as a natural language description of the problem symptom.

Step 904 includes selecting a first action template from the multiple action templates. Selecting the first action template from the multiple action templates can be based on a description of the set of operational data. Step 906 includes identifying one or more attributes associated with the first action template. The one or more attributes can include the top-K attributes derived from a collection of multiple attributes. Step 908 includes forming a first step of a resolution action in response to the query by populating the first action template with at least one of the one or more attributes.

Step 910 includes repeating (i) said selecting, (ii) said identifying, and (iii) said forming for at least a second action template from the multiple action templates to form a second step of the resolution action, wherein said repeating is based on (a) the first step of the resolution action and (b) the set of operational data. Selecting the second action template from the multiple action templates can include retrieving the top-K next action templates based on the first action template.

Step 912 includes outputting the resolution action, wherein the resolution action comprises a fixed sequence of at least (i) the first step and (ii) the second step.

Additionally, in at least one embodiment of the invention, (i) the determining step, (ii) the selecting step, (iii) the identifying step, (iv) the forming step and (v) the repeating step depicted in FIG. 9 can be implemented via a user interface. The user interface can include a display that is divided into multiple quadrants.

In such an embodiment, a description of the set of operational data can be positioned in a first of the multiple quadrants of the user interface display. Also, the multiple action templates can be populated in a third of the multiple quadrants of the user interface display. Further, the first action template can be transferred from the third of the multiple quadrants of the user interface display to a second of the multiple quadrants of the user interface display. Additionally, the one or more attributes associated with the first action template can be transferred to the second of the multiple quadrants of the user interface display. Such an embodiment can also include deleting a formed step in the second of the multiple quadrants of the user interface display and restoring the user interface display to a state prior to the forming of the deleted step. Additionally, selecting the second action template from the multiple action templates can be carried out in a fourth of the multiple quadrants of the user interface display.

Also, one or more embodiments of the invention can include outputting the resolution action, wherein the resolution action comprises a tree of action steps comprising at least (i) the first step and (ii) the second step.

The techniques depicted in FIG. 9 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 10:
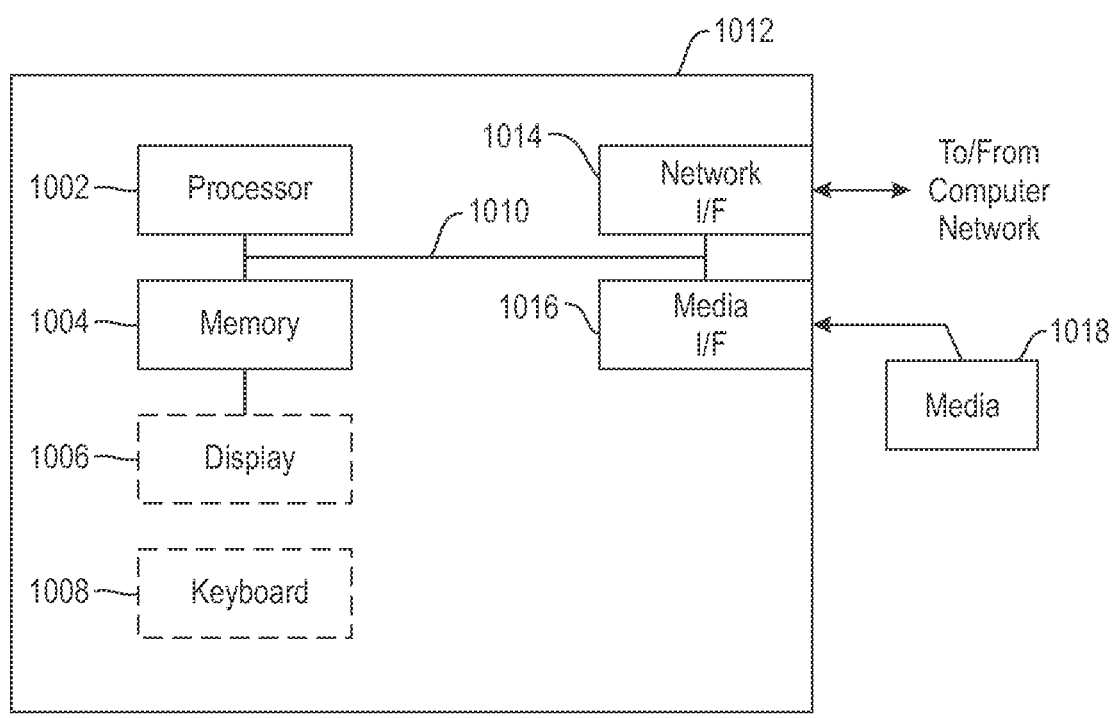
FIG. 10 is a system diagram of an exemplary computer system on which at least one embodiment of the invention can be implemented.

Additionally, an embodiment of the present invention can make use of software running on a computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1002. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining a set of action-steps with a corresponding proper execution sequence based on steps taken using IT operational data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    associating multiple action templates with a set of operational data corresponding to a query, wherein the query comprises a natural language description of one or more problem symptoms;
    selecting a first action template from the multiple action templates;
    identifying one or more attributes associated with the first action template;
    forming a first step of a resolution action in response to the query by populating the first action template with at least one of the one or more attributes;
    repeating (i) said selecting, (ii) said identifying, and (iii) said forming for at least a second action template from the multiple action templates to form a second step of the resolution action, wherein said repeating is based on (a) the first step of the resolution action and (b) the set of operational data;
    implementing (i) said associating, (ii) said selecting, (iii) said identifying, (iv) said forming and (v) said repeating via a user interface, wherein the user interface comprises a display that is divided into four quadrants and an origin point, wherein the origin point represents a reference point used to depict relevance in the user interface display, and wherein said implementing comprises:
        positioning a description of the set of operational data in a first of the four quadrants of the user interface display;
        populating the multiple action templates in a third of the four quadrants of the user interface display;
        transferring the first action template from the third quadrant to a second of the four quadrants of the user interface display;
        transferring the one or more attributes associated with the first action template to the second quadrant of the user interface display;
        transferring the second action template from the third quadrant to a fourth of the four quadrants of the user interface display; and
        wherein one or more of the action templates in the third quadrant and the fourth quadrant are positioned, within the third quadrant and the fourth quadrant, closer to the origin upon a determination that the one or more action templates are more relevant to the query than the remaining action templates in the third quadrant and the fourth quadrant; and
    outputting the resolution action, wherein the resolution action comprises a fixed sequence of at least (i) the first step and (ii) the second step;
    wherein the steps are carried out by at least one computing device.

2. The computer-implemented method of claim 1, wherein the multiple action templates comprise the top-K action templates derived from a collection of action templates.

3. The computer-implemented method of claim 1, wherein said selecting the first action template from the multiple action templates is based on a description of the set of operational data.

4. The computer-implemented method of claim 1, wherein the one or more attributes comprise the top-K attributes derived from a collection of multiple attributes.

5. The computer-implemented method of claim 1, wherein said selecting the second action template from the multiple action templates comprises retrieving the top-K next action templates based on the first action template.

6. The computer-implemented method of claim comprising:
    deleting a formed step in the second of the multiple quadrants of the user interface display and restoring the user interface display to a state prior to the forming of the deleted step.

7. A computer program product, the computer program product comprising a computer readable storage medium having program instructions embodied therewith, the program instructions executable by a device to cause the device to:

associate multiple action templates with a set of operational data corresponding to a query, wherein the query comprises a natural language description of one or more problem symptoms;

select a first action template from the multiple action templates;

identify one or more attributes associated with the first action template;

form a first step of a resolution action in response to the query by populating the first action template with at least one of the one or more attributes;

repeat (i) said selecting, (ii) said identifying, and (iii) said forming for at least a second action template from the multiple action templates to form a second step of the resolution action, wherein said repeating is based on (a) the first step of the resolution action and (b) the set of operational data;

implement (i) said associating, (ii) said selecting, (iii) said identifying, (iv) said forming and (v) said repeating via a user interface, wherein the user interface comprises a display that is divided into four quadrants and an origin point, wherein the origin point represents a reference point used to depict relevance in the user interface display, and wherein said implementing comprises:

positioning a description of the set of operational data in a first of the four quadrants of the user interface display;

populating the multiple action templates in a third of the four quadrants of the user interface display;

transferring the first action template from the third quadrant to a second of the four quadrants of the user interface display;

transferring the one or more attributes associated with the first action template to the second quadrant of the user interface display;

transferring the second action template from the third quadrant to a fourth of the four quadrants of the user interface display; and wherein one or more of the action templates in the third quadrant and the fourth quadrant are positioned, within the third quadrant and the fourth quadrant, closer to the origin upon a determination that the one or more action templates are more relevant to the query than the remaining action templates in the third quadrant and the fourth quadrant; and output the resolution action, wherein the resolution action comprises a fixed sequence of at least (i) the first step and (ii) the second step.

8. A system comprising:

a memory; and at least one processor coupled to the memory and configured for:

associating multiple action templates with a set of operational data corresponding to a query, wherein the query comprises a natural language description of one or more problem symptoms;

selecting a first action template from the multiple action templates;

identifying one or more attributes associated with the first action template;

forming a first step of a resolution action in response to the query by populating the first action template with at least one of the one or more attributes;

repeating (i) said selecting, (ii) said identifying, and (iii) said forming for at least a second action template from the multiple action templates to form a second step of the resolution action, wherein said repeating is based on (a) the first step of the resolution action and (b) the set of operational data;

implementing (i) said associating, (ii) said selecting, (iii) said identifying, (iv) said forming and (v) said repeating via a user interface, wherein the user interface comprises a display that is divided into four quadrants and an origin point, wherein the origin point represents a reference point used to depict relevance in the user interface display, and wherein said implementing comprises:

positioning a description of the set of operational data in a first of the four quadrants of the user interface display;

populating the multiple action templates in a third of the four quadrants of the user interface display;

transferring the first action template from the third quadrant to a second of the four quadrants of the user interface display;

transferring the one or more attributes associated with the first action template to the second quadrant of the user interface display;

transferring the second action template from the third quadrant to a fourth of the four quadrants of the user interface display; and wherein one or more of the action templates in the third quadrant and the fourth quadrant are positioned, within the third quadrant and the fourth quadrant, closer to the origin upon a determination that the one or more action templates are more relevant to the query than the remaining action templates in the third quadrant and the fourth quadrant; and outputting the resolution action, wherein the resolution action comprises a fixed sequence of at least (i) the first step and (ii) the second step.

9. A computer-implemented method, comprising:

associating multiple action templates with a set of operational data corresponding to a query, wherein the query comprises a natural language description of one or more problem symptoms;

selecting a first action template from the multiple action templates;

identifying one or more attributes associated with the first action template;

forming a first step of a resolution action in response to the query by populating the first action template with at least one of the one or more attributes;

repeating (i) said selecting, (ii) said identifying, and (iii) said forming for at least a second action template from the multiple action templates to form a second step of the resolution action, wherein said repeating is based on (a) the first step of the resolution action and (b) the set of operational data;

implementing (i) said associating, (ii) said selecting, (iii) said identifying, (iv) said forming and (v) said repeating via a user interface, wherein the user interface comprises a display that is divided into four quadrants and an origin point, wherein the origin point represents a reference point used to depict relevance in the user interface display, and wherein said implementing comprises:

positioning a description of the set of operational data in a first of the four quadrants of the user interface display;

populating the multiple action templates in a third of the four quadrants of the user interface display;

transferring the first action template from the third quadrant to a second of the four quadrants of the user interface display;

transferring the one or more attributes associated with the first action template to the second quadrant of the user interface display;

transferring the second action template from the third quadrant to a fourth of the four quadrants of the user interface display; and wherein one or more of the action templates in the third quadrant and the fourth quadrant are positioned, within the third quadrant and the fourth quadrant, closer to the origin upon a determination that the one or more action templates are more relevant to the query than the remaining action templates in the third quadrant and the fourth quadrant; and outputting the resolution action, wherein the resolution action comprises a tree of action steps comprising at least (i) the first step and (ii) the second step;

wherein the steps are carried out by at least one computing device.

10. The computer-implemented method of claim 9, wherein said selecting the first action template from the multiple action templates is based on a description of the set of operational data.

11. The computer-implemented method of claim 9, wherein the one or more attributes comprise the top-K attributes derived from a collection of multiple attributes.

12. The computer-implemented method of claim 9, wherein said selecting the second action template from the multiple action templates comprises retrieving the top-K next action templates based on the first action template.

13. The computer-implemented method of claim 9, wherein (i) said associating, (ii) said selecting, (iii) said identifying, (iv) said forming and (v) said repeating are implemented via a user interface.

* * * * *